US007353364B1

(12) United States Patent
Chong et al.

(10) Patent No.: US 7,353,364 B1
(45) Date of Patent: Apr. 1, 2008

(54) APPARATUS AND METHOD FOR SHARING A FUNCTIONAL UNIT EXECUTION RESOURCE AMONG A PLURALITY OF FUNCTIONAL UNITS

(75) Inventors: Jike Chong, Austin, TX (US);
Christopher Olson, Austin, TX (US);
Gregory F. Grohoski, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 407 days.

(21) Appl. No.: 10/881,261

(22) Filed: Jun. 30, 2004

(51) Int. Cl.
*G06F 9/30* (2006.01)
(52) U.S. Cl. .................................. 712/215; 712/222
(58) Field of Classification Search ................ 712/222, 712/215
See application file for complete search history.

(56) References Cited

U.S. PATENT DOCUMENTS

| | | | |
|---|---|---|---|
| 5,003,596 A * | 3/1991 | Wood | 380/28 |
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,515,308 A | 5/1996 | Karp et al. | |
| 5,546,593 A | 8/1996 | Kimura et al. | |
| 5,619,439 A * | 4/1997 | Yu et al. | 708/500 |
| 5,954,789 A | 9/1999 | Yu et al. | |
| 5,987,587 A * | 11/1999 | Meltzer | 712/23 |
| 6,002,881 A * | 12/1999 | York et al. | 712/34 |
| 6,076,157 A | 6/2000 | Borkenhagen et al. | |
| 6,088,788 A | 7/2000 | Borkenhagen et al. | |
| 6,088,800 A | 7/2000 | Jones et al. | |
| 6,105,127 A | 8/2000 | Kimura et al. | |
| 6,131,104 A | 10/2000 | Oberman | |
| 6,148,395 A * | 11/2000 | Dao et al. | 712/222 |
| 6,212,544 B1 | 4/2001 | Borkenhagen et al. | |
| 6,282,554 B1 | 8/2001 | Abdallah et al. | |
| 6,341,347 B1 | 1/2002 | Joy et al. | |
| 6,349,319 B1 | 2/2002 | Shankar et al. | |

(Continued)

OTHER PUBLICATIONS

Tulsen et al., "Power-sensitive multithreaded architecture," IEEE 2000, pp. 199-206.

(Continued)

*Primary Examiner*—Richard L. Ellis
*Assistant Examiner*—Jacob Petranek
(74) *Attorney, Agent, or Firm*—Robert C. Kowert; Anthony Petro; Meyertons, Hood, Kivlin, Kowert & Goetzel, P.C.

(57) ABSTRACT

An apparatus and method for sharing a functional unit. In one embodiment, a processor may include instruction fetch logic configured to issue instructions, and a first functional unit configured to execute instructions issued from the instruction fetch logic and to execute operations issued from a second functional unit, where the operations are issued asynchronously with respect to the instructions. The second functional unit may be configured to provide one or more operands corresponding to a given operation to the first functional unit. The first functional unit may include temporary result storage configured to store a result of the given operation while the first functional unit executes a given instruction issued from the instruction fetch logic, and the first functional unit may be further configured to use the stored result as an operand of an operation issued subsequently to the given operation.

30 Claims, 8 Drawing Sheets

U.S. PATENT DOCUMENTS

| | | | |
|---|---|---|---|
| 6,357,016 B1 | 3/2002 | Rodgers et al. | |
| 6,397,239 B2 | 5/2002 | Oberman et al. | |
| 6,415,308 B1 | 7/2002 | Dhablania | |
| 6,427,196 B1 | 7/2002 | Adiletta et al. | |
| 6,434,699 B1 | 8/2002 | Jones et al. | |
| 6,496,925 B1 | 12/2002 | Rodgers et al. | |
| 6,507,862 B1 | 1/2003 | Joy et al. | |
| 6,523,050 B1 | 2/2003 | Dhablania et al. | |
| 6,530,014 B2* | 3/2003 | Alidina et al. | 712/221 |
| 6,564,328 B1 | 5/2003 | Grochowski et al. | |
| 6,567,839 B1 | 5/2003 | Borkenhagen et al. | |
| 6,594,681 B1 | 7/2003 | Prabhu | |
| 6,625,654 B1 | 9/2003 | Wolrich et al. | |
| 6,629,236 B1 | 9/2003 | Aipperspach et al. | |
| 6,629,237 B2 | 9/2003 | Wolrich et al. | |
| 6,651,158 B2* | 11/2003 | Burns et al. | 712/205 |
| 6,668,308 B2 | 12/2003 | Barroso et al. | |
| 6,668,317 B1 | 12/2003 | Bernstein et al. | |
| 6,671,827 B2 | 12/2003 | Guilford et al. | |
| 6,681,345 B1 | 1/2004 | Storino et al. | |
| 6,687,838 B2 | 2/2004 | Orenstien et al. | |
| 6,694,347 B2 | 2/2004 | Joy et al. | |
| 6,694,425 B1 | 2/2004 | Eickemeyer | |
| 6,697,935 B1 | 2/2004 | Borkenhagen et al. | |
| 6,725,354 B1* | 4/2004 | Kahle et al. | 712/34 |
| 6,728,845 B2 | 4/2004 | Adiletta et al. | |
| 6,748,556 B1 | 6/2004 | Storino et al. | |
| 6,801,997 B2 | 10/2004 | Joy et al. | |
| 6,820,107 B1 | 11/2004 | Kawai et al. | |
| 6,847,985 B1 | 1/2005 | Gupta et al. | |
| 6,857,064 B2 | 2/2005 | Smith et al. | |
| 6,883,107 B2 | 4/2005 | Rodgers et al. | |
| 6,889,319 B1 | 5/2005 | Rodgers et al. | |
| 6,898,694 B2 | 5/2005 | Kottapalli et al. | |
| 7,080,111 B2* | 7/2006 | Pangal et al. | 708/501 |
| 7,117,389 B2* | 10/2006 | Luick | 714/11 |
| 7,120,660 B2* | 10/2006 | Elbe et al. | 708/491 |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

APPARATUS AND METHOD FOR SHARING A FUNCTIONAL UNIT EXECUTION RESOURCE AMONG A PLURALITY OF FUNCTIONAL UNITS

BACKGROUND OF THE INVENTION

1. Field of the Invention

This invention relates to processors and, more particularly, to optimizing functional units shared within processors.

2. Description of the Related Art

In some processor implementations, several different functional units may be provided to process different types of instructions or operations. For example, an integer execution unit may be configured to execute integer-type instructions, and a floating-point execution unit may be configured to execute floating-point instructions. In some embodiments, additional types of functional units may be provided for different purposes. Further, in some embodiments, certain functional units may be more tightly coupled to an instruction fetch pipeline than others; for example, a given functional unit may be logically implemented as a free-running coprocessor largely independent of instruction issue logic, or as part of a fixed pipeline whose operation is closely coordinated with instruction issue logic.

Depending on how instructions or operations are partitioned among functional units, different functional units may implement instructions or operations that are similar in nature. For example, multiplication instructions may be defined for both integer and floating-point operations. However, implementing separate execution resources for similar types of instructions may be costly, depending on the function. For example, hardware multipliers may require substantial die area, particularly as the width of the multiplier increases. Further, depending on the workload presented by executing software, in certain circumstances the separate execution resources may be poorly utilized, exacerbating the area cost of providing those resources.

SUMMARY

Various embodiments of an apparatus and method for sharing a functional unit are disclosed. In one embodiment, a processor may include instruction fetch logic configured to issue instructions, and a first functional unit configured to execute instructions issued from the instruction fetch logic and to execute operations issued from a second functional unit, where the operations are issued asynchronously with respect to the instructions. The second functional unit may be configured to provide one or more operands corresponding to a given operation to the first functional unit. The first functional unit may include temporary result storage configured to store a result of the given operation while the first functional unit executes a given instruction issued from the instruction fetch logic, and the first functional unit may be further configured to use the stored result as an operand of an operation issued subsequently to the given operation.

In one embodiment, a method may include instruction fetch logic issuing instructions to a first functional unit and a second functional unit issuing a given operation to the first functional unit, where the given operation is issued asynchronously with respect to the instructions issued to the first functional unit from the instruction fetch logic. The method may further include the first functional unit storing a result of the given operation in temporary result storage while the first functional unit executes a given instruction issued from the instruction fetch logic, and the first functional unit using the stored result as an operand of an operation issued subsequently to the given operation.

BRIEF DESCRIPTION OF THE DRAWINGS

FIG. 3 is a pipeline diagram illustrating the flow of instructions through one embodiment of a processor core.

Figure 1:
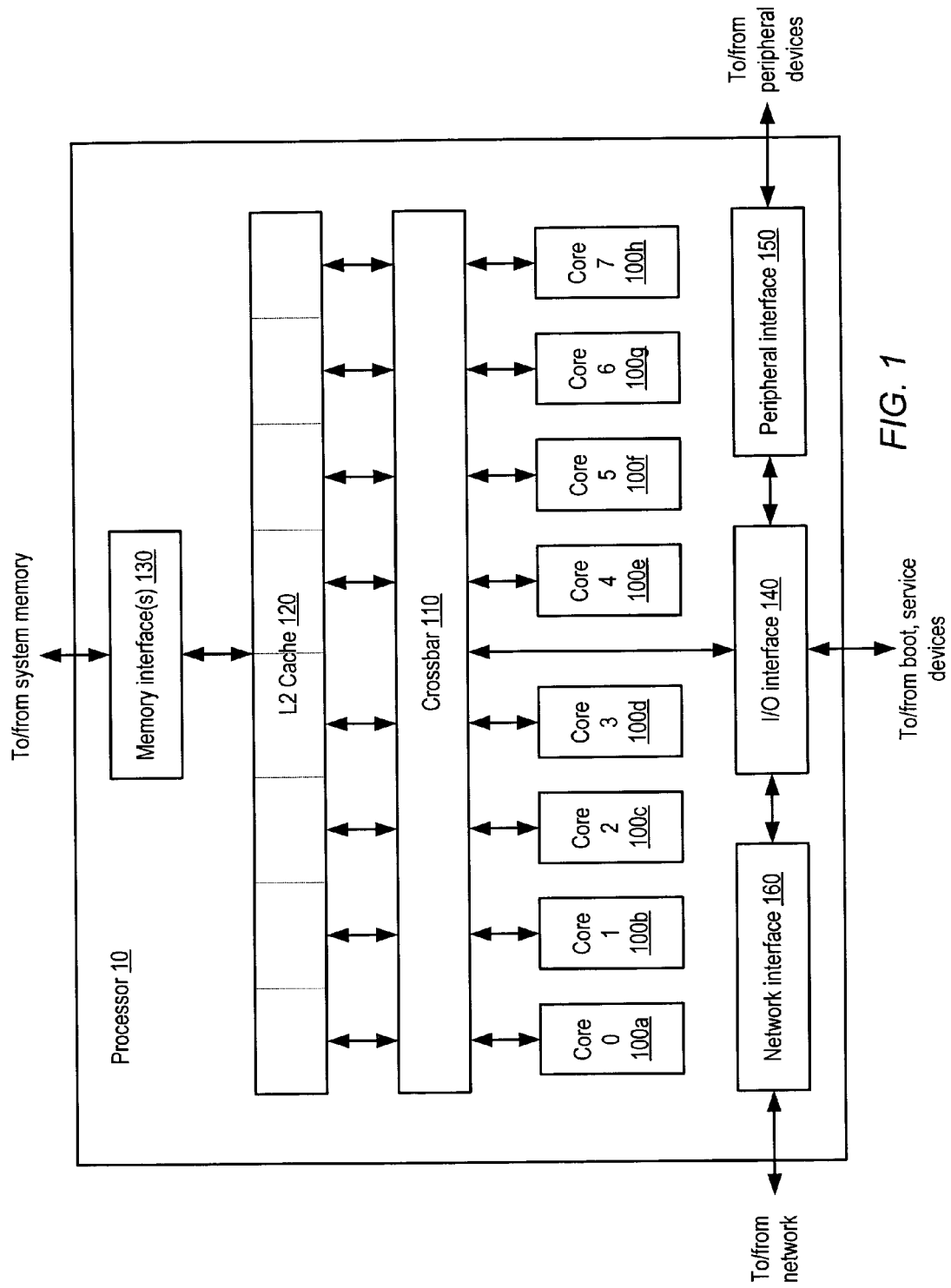
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
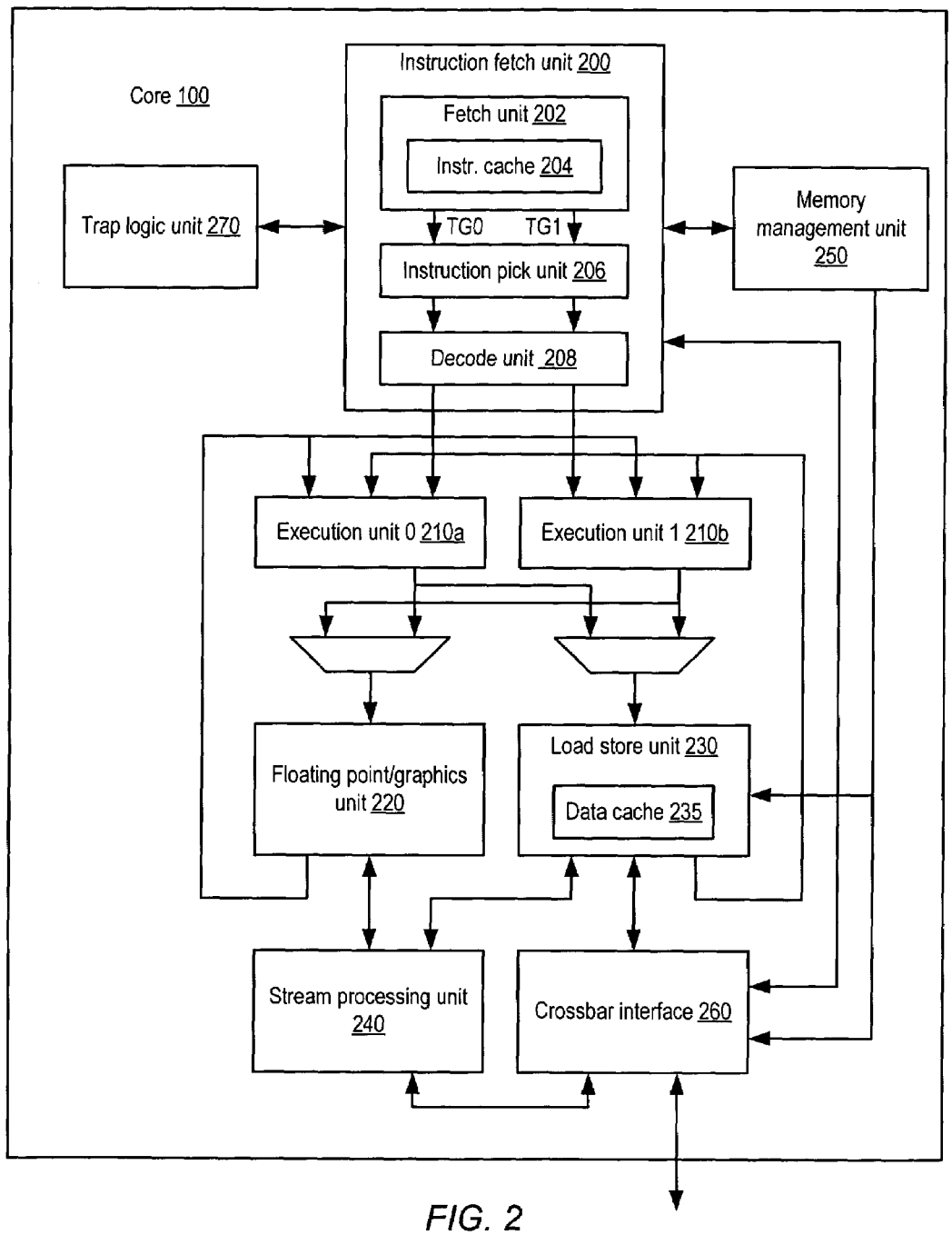
FIG. 2 is a block diagram illustrating one embodiment of a processor core configured to perform fine-grained multithreading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. As described in greater detail below, in one embodiment, SPU 240 may be configured to utilize resources within FGU 220 for certain operations. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Resource Sharing Among Functional Units

Figure 4:
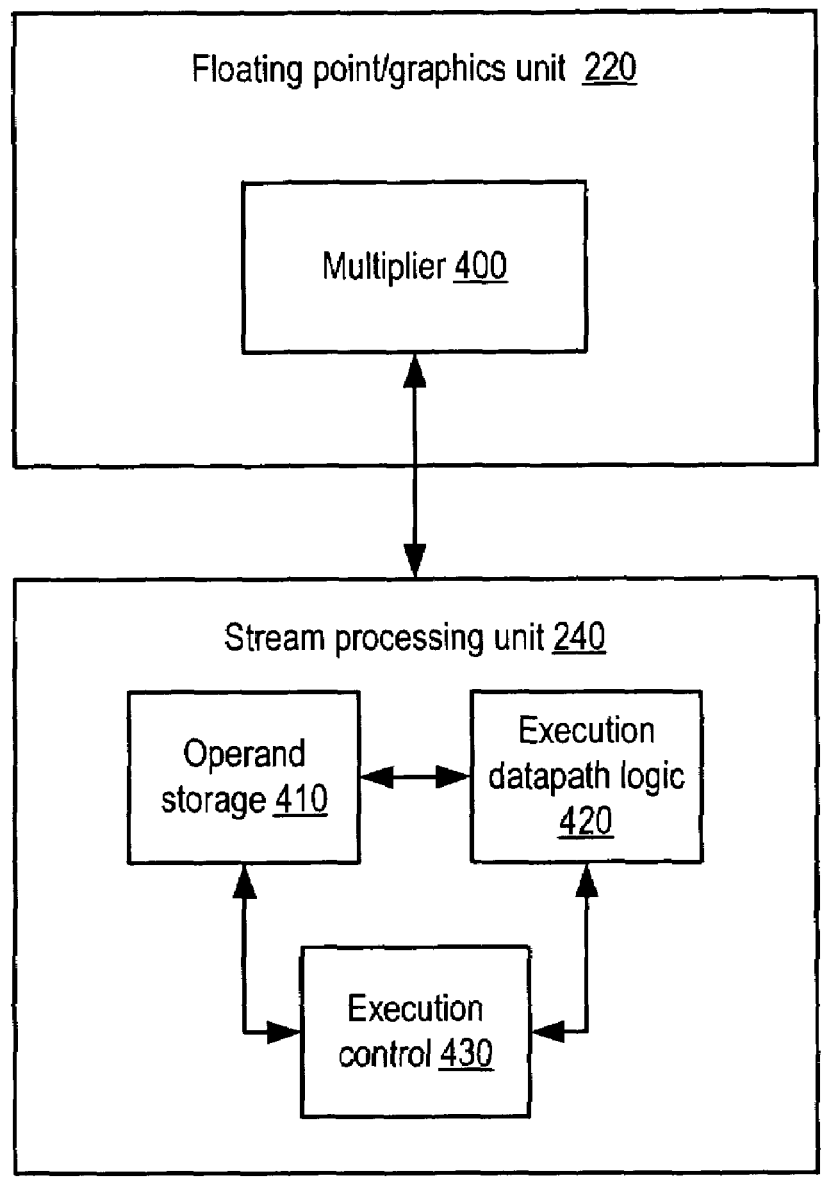
FIG. 4 is a block diagram illustrating one embodiment in which two functional units share a multiplier.

As noted above, in some embodiments SPU 240 may be configured to utilize certain execution resources within FGU 220. For example, in one embodiment, SPU 240 may implement a modular multiplication algorithm that makes frequent use of multiplication operations. As fast multiplier implementations generally consume substantial die area, in one embodiment, SPU 240 may be configured to share a multiplier implemented within FGU 220 with floating-point instructions that use that multiplier. One such embodiment is illustrated in FIG. 4, in which FGU 220 includes a multiplier 400 coupled for use by SPU 240. In the illustrated embodiment, SPU 240 includes operand storage 410, execution datapath logic 420 and execution control logic 430, each interconnected via a variety of interconnect mechanisms.

Operand storage 410 may be configured to store operands used by SPU 240 to perform various operations, as well as to store results of operations that may or may not be used as operands of future SPU operations. In various embodiments, operand storage 410 may be implemented as a register file, a cache, a queue or stack, or any other suitable organization for the types of operations implemented by SPU 240. In some embodiments, SPU 240 may be configured to load or store operands or results to memory external to core 100 via LSU 230.

Execution datapath logic 420 may be configured to perform various operations on data under the direction of execution control 430. For example, in various embodiments, execution datapath logic 420 may include one or more adders, shifters, Boolean operators, or more exotic datapath functions depending on the operations SPU 240 is configured to perform.

Execution control 430 may be configured to coordinate the execution of SPU operations. For example, in one embodiment execution control 430 may select operands from operand storage 410 for a particular operation, and configure datapath logic 420 to perform the operation. In some embodiments, execution control 430 may decompose a given complex SPU operation into a plurality of distinct SPU operations. For example, SPU 240 may be configured to perform a modular multiplication algorithm that includes a number of individual integer multiplications, as well as other operations such as addition and shift operations. In one embodiment, execution control 430 may implement a state machine for a given complex SPU operation, in which various states are configured to implement the distinct operations comprising the complex operation. For example, execution control 430 may implement a state machine configured to coordinate the various steps of a modular multiplication algorithm by configuring datapath logic 420 to perform the appropriate operations in a particular sequence. In another embodiment, execution control 430 may be configured to employ microcode to coordinate the operation of SPU 240. In such an embodiment, execution control 430 may be configured to issue microinstructions corresponding to a complex SPU operation, which may be decoded and executed by datapath logic 420. In some microcoded embodiments, the flow of execution control within SPU 240 may resemble the flow of instructions through core 100, with distinct fetch, decode, execute and writeback stages of operation.

In the illustrated embodiment, execution control 430 may be configured to control the issue of multiplication operations to multiplier 400 when such operations arise during the course of executing SPU operations. For example, execution control 430 may coordinate the retrieval of multiplication operands from operand storage 410, which may then be conveyed to multiplier 400 along with the appropriate control interface. One embodiment of an SPU 240 interface with multiplier 400 is described in greater detail in conjunction with the description of FIG. 5.

In one embodiment, SPU 240 may be configured as a coprocessor that executes asynchronously with respect to the instructions issued by IFU 200 for execution in FGU 220 and other functional units. In one such embodiment, SPU 240 may be indirectly programmed for operation, for example receiving operations and operands for execution via one or more control registers, and delivering results via those or additional control registers, rather than decoding specific instructions issued to SPU 240 by IFU 200. In such embodiments, SPU 240 may not explicitly receive instructions to execute. In other embodiments, SPU 240 may more directly interface with the instruction execution pipelines issued to and managed by IFU 200, but in some such embodiments, a given instruction received by SPU 240 may be decomposed into multiple distinct operations executed by SPU 240 as just described. In one embodiment, the distinct operations executed by SPU 240 as well as the operations issued from SPU 240 to FGU 220 for execution may be unrelated to the instructions issued from IFU 200 to FGU 220. For example, there may be no program counter value visible by IFU 200 associated with an operation issued by SPU 240.

While configuring SPU 240 to share multiplier 400 with instructions executed by FGU 220 may conserve implementation area relative to providing a dedicated multiplier within SPU 240, such sharing may create performance implications for SPU operations and/or FGU instructions. For example, in some embodiments where SPU 240 is configured to operate asynchronously and independently of instructions issued by IFU 200 as described above, SPU 240 may be physically located at a distance from the rest of the datapath of core 100, in order to optimize the physical placement of units whose execution is more directly coupled. Consequently, in some such embodiments, considerable latency may be incurred in transferring operands and results between SPU 240 and multiplier 400. For example, in one embodiment, one-way travel time between these units may require one or more execution cycles.

Such a data transfer delay may impose a particular penalty on sequences of dependent SPU operations issued to multiplier 400 for execution. For example, in some embodiments, a complex modular multiplication operation executed by SPU 240 may iteratively perform substantial numbers of multiplications in sequence, where each multiplication depends on the result of a previous multiplication as an input operand. Supposing, for example, that in one embodiment a given multiplication operation issued by SPU 240 required one execution cycle to read operands from operand storage 410, two execution cycles to transfer operands to and results from multiplier 400, four execution cycles to perform the multiplication within multiplier 400, and one execution cycle to write the result back to operand storage 410, a dependent multiplication operation would not be able to issue until eight cycles after the operation depended on. Assuming that one multiplication operation may issue in a given cycle, this reflects a seven-cycle issue penalty for dependent SPU multiplication operations, of which two cycles is transit latency between units. (Other embodiments in which different latencies and penalties may occur are possible and contemplated.)

Additionally, execution of sequences of dependent SPU multiplications may impact execution of multiplication instructions issued from IFU 200 to FGU 220. For example, in one embodiment, FGU 220 may be configured to execute floating-point or integer multiplication instructions issued from any of eight independent threads. In some embodiments, arbitration may be employed to ensure that SPU and non-SPU multiplications respectively receive a fair share of multiplier 400 execution bandwidth. However, in the event a given sequence of dependent SPU multiplications is interrupted, such as due to losing arbitration, restarting the sequence the next time SPU 240 wins arbitration may incur one or more execution cycles of delay as operands for the SPU multiplication operation are obtained from operand storage 410.

Figure 5:
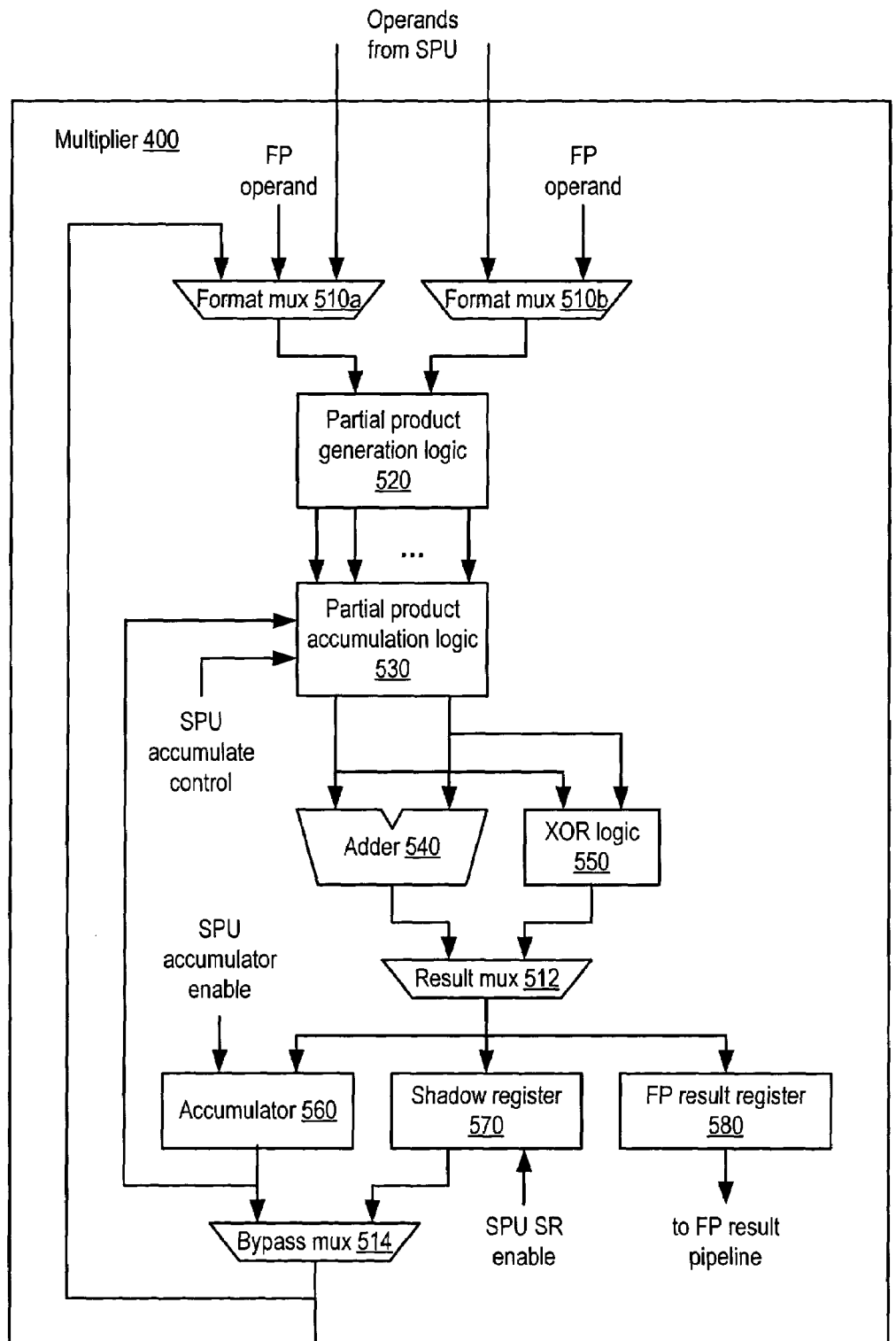
FIG. 5 is a block diagram illustrating one embodiment of a multiplier including optimizations to improve performance in a shared environment.

One embodiment of multiplier 400 including several features configured to reduce penalties associated with dependent SPU multiplication operations is illustrated in FIG. 5. In the illustrated embodiment, multiplier 400 includes format muxes 510a-b, each coupled to select a respective multiplication operand from floating-point operands provided from within FGU 220 or from SPU operands provided from SPU 240. In the illustrated embodiment, format mux 510a is coupled to receive an input from bypass mux 514 described below, although in other embodiments the bypass may be routed to format mux 510b. In some embodiments, format muxes 510a-b may select from other types of operand inputs and/or may be configured to perform additional operations. For example, in one embodiment format muxes 510a-b may be configured to align integer and floating-point mantissas to the appropriate bit positions for multiplication.

Format muxes 510a-b are in turn coupled to partial product generation logic 520, which is coupled to partial product accumulation logic 530. Partial product accumulation logic 530 is additionally coupled to receive an input from accumulator register 560 and an SPU accumulate control signal from SPU 240. Partial product accumulation logic 530 is coupled to provide inputs to adder 540 as well as XOR logic 550. In turn, the outputs of these units are selected by result mux 512, which is coupled to accumulator 560, a shadow register 570, and a floating-point result register 580. Each of accumulator 560 and shadow register 570 is coupled to receive a respective control signal from SPU 240, and the outputs of accumulator 560 and shadow register 570 are combined in bypass mux 514 prior to being transmitted to format mux 510a. This combined result is also transmitted to SPU 240. It is contemplated that in other embodiments, multiplier 400 may include additional or different elements, and that variations in arrangement of the illustrated elements are possible. For example, in one embodiment bypass mux 514 may be omitted and accumulator 560 and shadow register 570 routed directly to format mux 510a. In some embodiments, bypass mux 514 may be built directly into one of accumulator 560 or shadow register 570, or both registers may be combined into a single multiple-entry buffer structure.

The elements between format muxes 510a-b and result mux 512 may be configured according to any suitable multiplier architecture. For example, in one embodiment, partial product generation logic 520 may be configured to generate a plurality of partial products using a radix-4 Booth encoding algorithm, although in other embodiments a different algorithm may be employed for partial product generation. Once the partial products have been determined, partial product accumulation logic 530 may be configured to reduce the number of partial products through accumulation. For example, accumulation logic 530 may include a Wallace tree of carry save adders (CSAs) or another suitable arrangement of logic. In addition to the partial products generated by generation logic 520, in the illustrated embodiment, accumulation logic 530 may be configured to selectively accumulate the value stored in accumulator 560 as an additional partial product. In one embodiment, the value stored in accumulator 560 may be accumulated into the partial product summation only when the SPU accumulate control is asserted by SPU 240.

In the illustrated embodiment, accumulation logic 530 may be configured to produce two outputs, for example a sum operand and a carry operand. These two operands may be added by adder 540 to produce the multiplicative product of the operands selected by format muxes 510a-b. In various embodiments, adder 540 may employ any suitable architecture, such as a carry lookahead adder architecture or a carry select adder architecture, for example.

Multiplier 400 may be configured to perform multiplicative-type operations other than conventional arithmetic multiplication. In the illustrated embodiment, multiplier 400 may be configured to perform an XOR multiply in which partial products are accumulated without propagating carries between columns of partial product bits. During an XOR multiplication, XOR logic 550 may be configured to complete the multiplication by performing a logic XOR of the two partial products produced by accumulation logic 530. Result mux 512 may be configured to select either the arithmetic sum produced by adder 540 or the XOR result produced by XOR logic 550 as the multiplication result. In some embodiments, the function of XOR logic 550 as well as result mux 512 may be incorporated within adder 540.

In some embodiments, multiplier 400 may include other logic not shown. For example, multiplier 400 may include additional logic configured to shift or otherwise modify operands, intermediate results, or the final result. Additionally, while the illustrated logic may perform only the mantissa portion of a floating-point multiplication instruction, multiplier 400 may include logic configured to perform exponent arithmetic, determine a result sign, detect floating-point exceptions, and other related tasks for floating-point instructions. Additionally, multiplier 400 may be configured for other modes of operation in some embodiments, such as partitioned multiplication of packed integer operands, for example.

In the illustrated embodiment, FP result register 580 may be configured to store the result generated by result mux 512 before that result is conveyed to the remainder of the floating-point multiply result pipeline. For example, in one embodiment, FP result register 580 may be a pipeline register at the boundary between two multiply pipeline execution stages. In various embodiments, additional logic downstream from FP result register 580 may include rounding logic, result bypass logic, and result writeback logic (e.g., to a floating-point register file). In some embodiments, FP result register 580 may be configured to capture any result generated by result mux 512, regardless of whether the result corresponds to a floating-point instruction or an operation issued to multiplier 400 by SPU 240. In other embodiments, FP result register 580 (as well as downstream logic) may be disabled, for example to conserve power, when no floating-point instruction is in the pipeline.

Accumulator 560 and shadow register 570 may also be configured to selectively store the result generated by result mux 512 dependent upon respective control signals driven by SPU 240 for a given multiply operation. For example, in one embodiment, SPU 240 may be configured to issue a multiply-accumulate operation to multiplier 400, in which the multiplicative product is added to an existing accumulator value and the resulting sum is preserved as the new accumulator value. In one embodiment, accumulator 560 may be configured to store the accumulator value for multiply-accumulate operations. In such an embodiment, when SPU 240 issues a multiply-accumulate operation to multiplier 400, it may be configured to assert the SPU accumulate control signal, in response to which partial product accumulation logic 530 may add the existing value of accumulator 560 along with the partial products generated for the multiplication operation as described above. Further, SPU 240 may assert the SPU accumulator enable signal, in response to which accumulator 560 may store the new accumulator value (i.e., the computed product plus the previous accumulator value). If a multiply operation issued by SPU 240 is not intended to update the accumulator value, SPU 240 may be configured to assert the SPU shadow register enable signal, in response to which shadow register 570 may store the result generated by result mux 512.

As noted above, in some embodiments SPU 240 may be configured to issue multiple dependent multiply operations to multiplier 400, for example as part of iterative execution of a complex SPU operation. Further, in some instances an instruction issued from IFU 200 to FGU 220 that uses multiplier 400 may take precedence over an operation issued from SPU 240 to multiplier 400, for example in embodiments where SPU 240 loses arbitration for access to multiplier 400. In the illustrated embodiment, accumulator 560 and shadow register 570 may be examples of temporary result storage configured to store a result of an SPU-issued operation while multiplier 400 executes an instruction issued from IFU 200. Subsequently, when SPU 240 successfully issues an operation to multiplier 400 that depends on a result value previously stored in accumulator 560 or shadow register 570 (e.g., the dependent SPU operation wins arbitration), bypass mux 514 may be configured to select the appropriate stored result and to convey that result to format mux 510a to be used as an operand. In one embodiment, since accumulator 560 and shadow register 570 are internal to multiplier 400, their contents may be bypassed internally to multiplier 400 without incurring additional latency to write and read depended-upon results to SPU 240. It is contemplated that in some embodiments, temporary result storage within multiplier 400 may include multiple instances of accumulator 560, shadow register 570, or both, and that each such instance may be individually controllable by SPU 240 to selectively store a result of a given SPU operation. Further, the stored result in each such instance may be selectively bypassed as an operand of a subsequent SPU operation.

In some embodiments, a result written to temporary result storage such as accumulator 560 or shadow register 570 may also be conveyed back to SPU 240 to be written, for example, to operand storage 410. In the illustrated embodiment, the output of bypass mux 514 may convey such a result to SPU 240, although in other embodiments, the result to be conveyed may be derived from a different point, such as the output of result mux 512, for example.

The bypass path that, in the illustrated embodiment, conveys a result from bypass mux 514 to format mux 510a as just described may also be configured to improve the performance of consecutive dependent operations issued from SPU 240. In one embodiment as described above, transit latency between SPU 240 and FGU 220 may require two execution cycles round-trip, and writing and reading a result to operand storage 410 may require another two execution cycles, contributing to an overall penalty of seven execution cycles of delay before SPU 240 may issue a second operation to multiplier 400 that depends on the result of an earlier-issued operation. However, in the illustrated embodiment, a result of one SPU-issued operation may be bypassed to the input of a dependent SPU-issued operation as an operand without incurring the transit latency and internal latency of operand storage 410, thus potentially reducing the penalty to dependent operations from seven cycles to three cycles in one embodiment.

Figure 6:
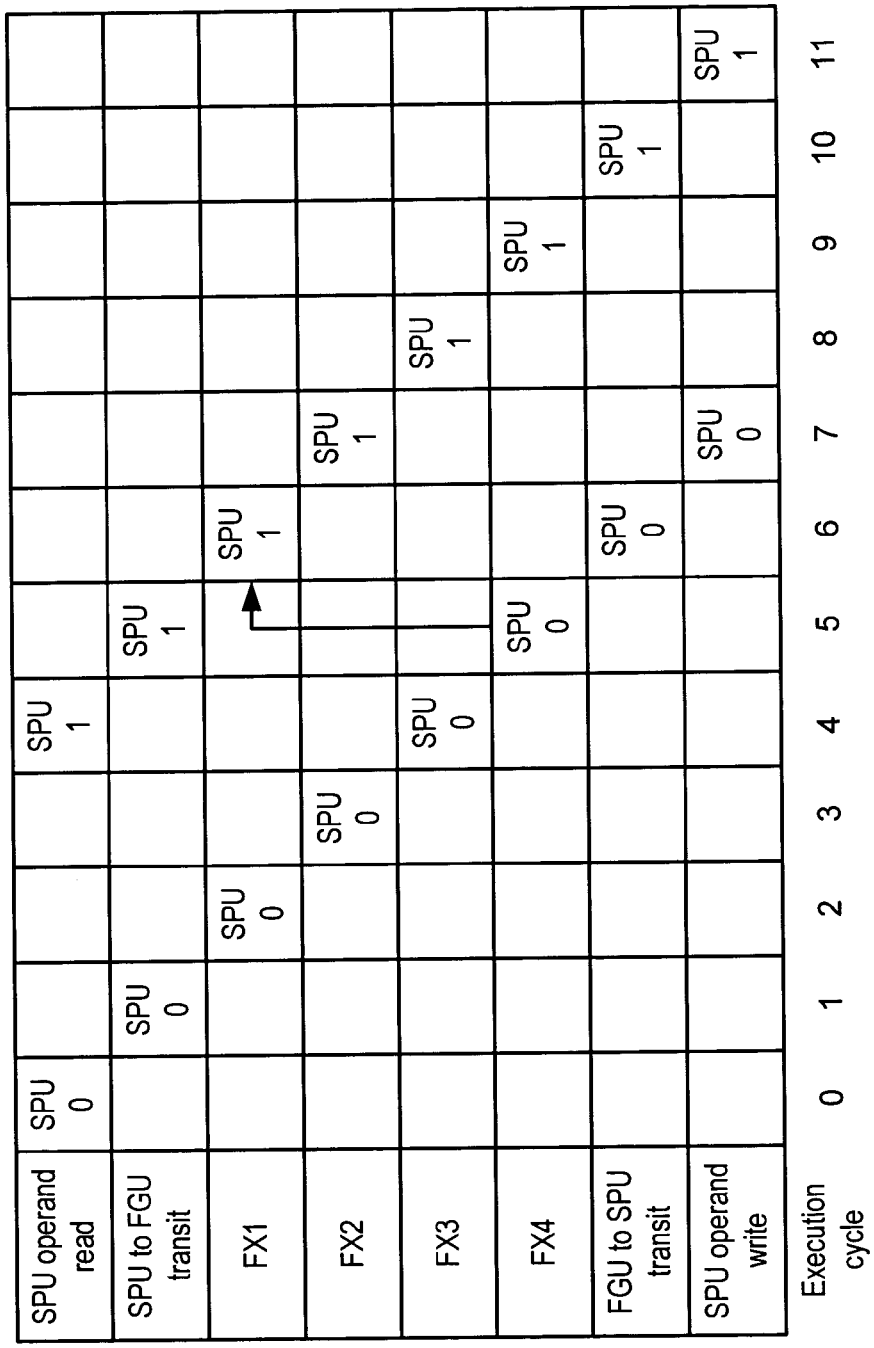
FIG. 6 is a pipeline diagram illustrating the timing of one embodiment of a bypass path within a multiplier.

The operation of one embodiment of the bypass path is illustrated in the pipeline diagram shown in FIG. 6. In the illustrated embodiment, a given SPU operation issued to multiplier 400 proceeds through eight execution stages. In the first stage, operands for the operation are read from operand storage 410. In the second stage, the operands and control information associated with the operation is transmitted from SPU 240 to FGU 220. The core execution stages of multiplier 400, designated FX1-FX4, follow. In various embodiments, the execution of format muxes 510a-b, partial product generation logic 520, partial product accumulation logic 530, adder 540, XOR logic 550, result mux 512, accumulator 560 and shadow register 570 may be distributed across execution stages FX1-FX4 according to implementation needs. Following stage FX4, the result of the SPU operation is transmitted from FGU 220 to SPU 240 during one execution stage and written to operand storage 410 in the next stage.

In the illustrated embodiment, SPU operation SPU 0 enters the first stage of execution (operand read) during cycle 0 and proceeds through the pipeline. The result of SPU 0 enters accumulator 560 or shadow register 570, depending on the controls asserted by SPU 240, in the FX4 stage during cycle 5. Meanwhile, during cycle 4, SPU 240 issues a second operation SPU 1 that is dependent on the result of operation SPU 0. During cycles 4 and 5, control for operation SPU 1 is determined, a non-dependent operand of operation SPU 1 (if needed) is retrieved from operand storage 410, and both are transmitted to FGU 220. In cycle 6, SPU 1 enters stage FX1 and begins execution. At the same time, the result of operation SPU 0 is bypassed as an operand to SPU 1. Execution of operation SPU 1 may then proceed through the remaining stages of the pipeline.

As shown, dependent operation SPU 1 is configured to issue four cycles after SPU 0, for an issue penalty of three cycles. In contrast, in the worst-case scenario, SPU 1 may not issue until execution cycle 8, after the result of SPU 0 has been written back to operand storage 410. In the illustrated embodiment, cycle 4 is the earliest cycle in which SPU 1 may issue, owing to the depth of the multiplier pipeline and the dependence of SPU 1 on the result of SPU 0. However, SPU 1 may not successfully issue during cycle 4, for example if FGU 220 wins arbitration for multiplier 400. In such a case, the result of SPU 0 may be held in accumulator 560 or shadow register 570 and bypassed to SPU 1 at the earliest possible opportunity.

In other embodiments, it is contemplated that the SPU operation execution pipeline may include different numbers and types of execution stages. For example, data transit latency between SPU 240 and FGU 220 may vary, as may the depth of the multiplier 400 pipeline. In some embodiments, SPU 240 may include an internal bypass path that may enable an arriving result from multiplier 400 to be returned as an operand without requiring the result to be written to and then read from operand storage 410.

Figure 7:
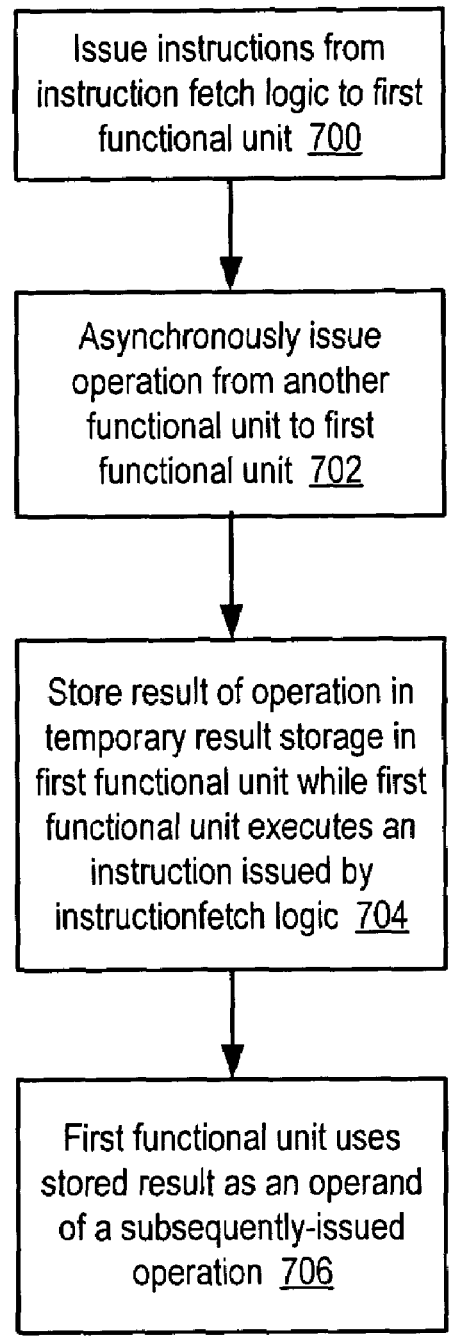
FIG. 7 is a flow diagram illustrating one embodiment of a method of operation of a shared functional unit.
Figure 8:
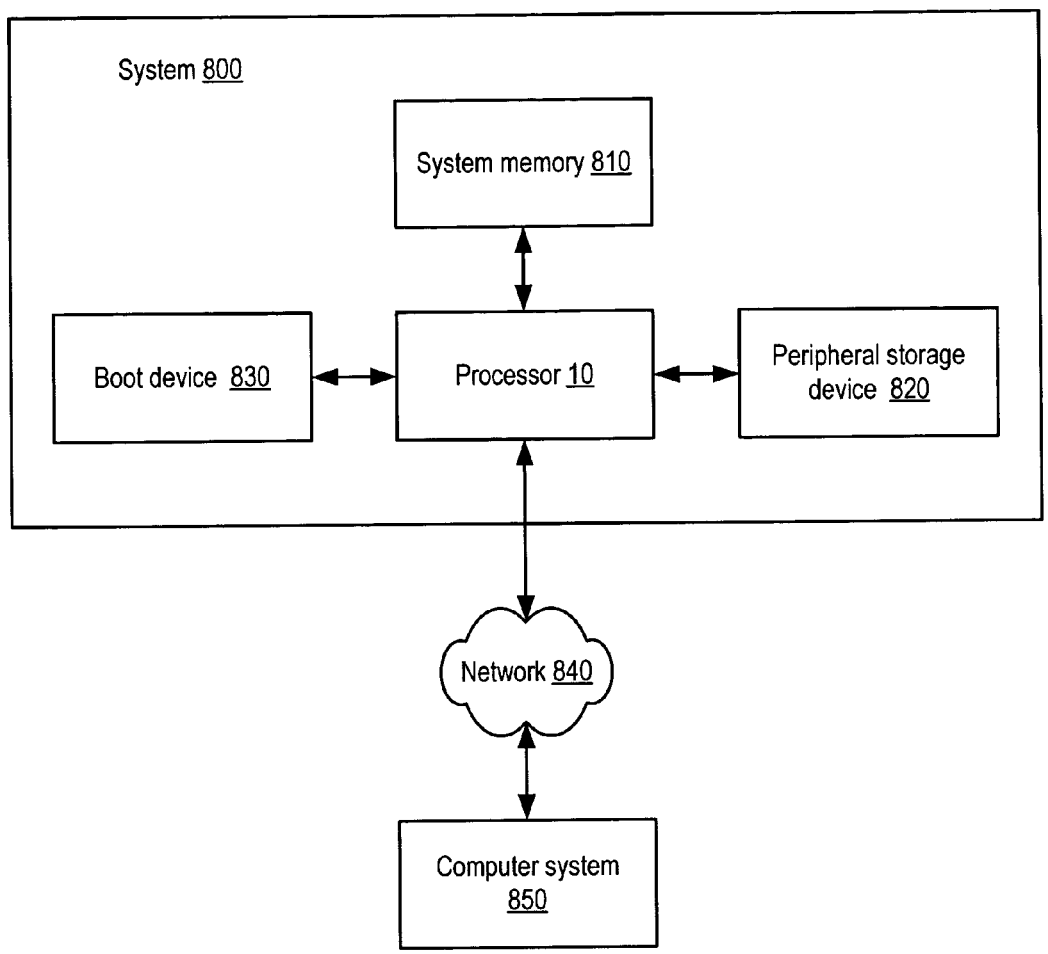
FIG. 8 is a block diagram illustrating one embodiment of a system including a multithreaded processor.

One embodiment of a method of operation of a shared functional unit is illustrated in FIG. 7. Referring collectively to FIGS. 1-7, operation begins in block 700 where instructions are issued from instruction fetch logic to a first functional unit. For example, in one embodiment, IFU 200 may be configured to issue instructions from different threads during successive execution cycles, one or more of which may be issued to FGU 220 for execution.

Additionally, another functional unit may be configured to issue an operation to the first functional unit, where the operation may be issued asynchronously with respect to instructions issued to the first function unit from the instruction fetch logic (block 702). For example, SPU 240 may be configured in one embodiment to issue multiply operations to multiplier 400 of FGU 220 as described above, where the SPU-issued operations may be asynchronous with respect to and unrelated to the instructions issued to FGU 220 from IFU 200.

The first functional unit may store the result of the issued operation in temporary result storage while a given instruction issued to the first functional unit executes (block 704). For example, in one embodiment the operation result may be stored in accumulator 560 or shadow register 570 as described above. The result may be held in its corresponding register while a floating-point instruction issued from IFU 200 executes in multiplier 400.

The first functional unit may then use the stored result of the previously-issued operation as an operand of a subsequently-issued operation (block 706). For example, in one embodiment SPU 240 may issue an operation to FGU 220 that depends on a previous operation's result that may be stored in accumulator 560 or shadow register 570. In such a case, the result may be retrieved from its corresponding temporary storage as an operand of the dependent operation, as described above.

In the foregoing discussion, the functional unit shared between FGU 220 and SPU 240 is described as a multiplier. However, in other embodiments, it is contemplated that the foregoing techniques may be applied to any type of functional unit that may be shared between execution of instructions issued by instruction fetch logic and operations issued by another functional unit, where the operations may be issued asynchronously with respect to and executed independently of the instructions.

Exemplary System Embodiment

As described above, in some embodiments processor 10 of FIG. 1 may be configured to interface with a number of external devices. One embodiment of a system including processor 10 is illustrated in FIG. 6. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/ display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

In the foregoing discussion, references made to values such as zero or one refer to arithmetic values. It is contemplated that in various embodiments, a given arithmetic value may be implemented using either positive logic, in which logic values '1' and '0' correspond respectively to arithmetic values one and zero, or negative logic, in which this correspondence is inverted. It is further contemplated that any other suitable signaling scheme for conveying arithmetic values may be employed.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:

instruction fetch logic configured to issue instructions;

a first functional unit configured to execute instructions issued from said instruction fetch logic; and a second functional unit configured to execute operations in response to instructions issued by said instruction fetch logic without receiving and decoding instructions corresponding to said operations from said instruction fetch logic, wherein said operations execute asynchronously with respect to instructions issued from said instruction fetch logic;

wherein during the course of executing at least one of said operations, said second functional unit is further configured to issue one or more additional operations to said first functional unit for execution, wherein said one or more additional operations are issued asynchronously with respect to said instructions issued to said first functional unit, and wherein no program counter value visible by said instruction fetch logic is associated with said one or more operations issued to said first functional unit by said second functional unit;

wherein said second functional unit is configured to provide one or more operands corresponding to a given one of said one or more additional operations to said first functional unit;

wherein said first functional unit comprises temporary result storage configured to store a result of said given additional operation while said first functional unit executes a given instruction issued from said instruction fetch logic; and wherein said first functional unit is further configured to use said stored result as an operand of an operation issued subsequently to said given additional operation.

2. The processor as recited in claim 1, wherein said instruction fetch logic is further configured to issue a first instruction from one of a plurality of threads during one execution cycle and to issue a second instruction from another one of said plurality of threads during a successive execution cycle.

3. The processor as recited in claim 1, wherein said first functional unit includes a multiplier configured to execute floating-point multiplication instructions.

4. The processor as recited in claim 3, wherein said multiplier is further configured to execute a modular multiplication operation.

5. The processor as recited in claim 3, wherein said temporary result storage comprises an accumulator register and wherein said multiplier is further configured to execute a multiply-accumulate operation.

6. The processor as recited in claim 1, wherein said second functional unit is further configured to issue a first one of said one or more additional operations and a second one of said one or more additional operations dependent on said first additional operation to said first functional unit for execution, wherein said first functional unit is further configured to bypass a respective result of said first additional operation from a result execution stage of said first additional operation to an input execution stage of said second additional operation, and wherein said bypass is internal to said first functional unit.

7. The processor as recited in claim 1, wherein said second functional unit includes a cryptographic unit, and wherein said one or more additional operations are unrelated to the instructions issued from said instruction fetch logic to said first functional unit.

8. The processor as recited in claim 7, wherein said cryptographic unit is configured to perform modular arithmetic operations.

9. The processor as recited in claim 1, wherein said temporary result storage is further configured to selectively store said result of said given additional operation dependent upon a control indication from said second functional unit.

10. The processor as recited in claim 1, wherein said temporary result storage includes one or more shadow registers.

11. A method, comprising:

instruction fetch logic issuing instructions to a first functional unit;

a second functional unit executing operations in response to instructions issued by said instruction fetch logic without receiving and decoding instructions corresponding to said operations from said instruction fetch logic, wherein said second function unit executing operations occurs asynchronously with respect to said instruction fetch logic issuing instructions;

during the course of executing at least one of said operations, said second functional unit issuing one or more additional operations to said first functional unit, wherein said one or more additional operations are issued asynchronously with respect to said instructions issued to said first functional unit from said instruction fetch logic, and wherein no program counter value visible by said instruction fetch logic is associated with said one or more operations issued to said first functional unit by said second functional unit;

said first functional unit storing a result of a given one of said one or more additional operations in temporary result storage while said first functional unit executes a given one of said instructions issued from said instruction fetch logic; and said first functional unit using said stored result as an operand of an operation issued by said second functional unit subsequently to said given additional operation.

12. The method as recited in claim 11, further comprising said instruction fetch logic issuing a first instruction from one of a plurality of threads during one execution cycle and issuing a second instruction from another one of said plurality of threads during a successive execution cycle.

13. The method as recited in claim 11, wherein said first functional unit includes a multiplier configured to execute floating-point multiplication instructions.

14. The method as recited in claim 13, wherein said multiplier is further configured to execute a modular multiplication operation.

15. The method as recited in claim 13, wherein said temporary result storage comprises an accumulator register and wherein said multiplier is further configured to execute a multiply-accumulate operation.

16. The method as recited in claim 11, wherein said second functional unit is further configured to issue a first one of said one or more additional operations and a second one of said one or more additional operations dependent on said first additional operation to said first functional unit for execution, wherein said first functional unit is further configured to bypass a respective result of said first additional operation from a result execution stage of said first additional operation to an input execution stage of said second additional operation, and wherein said bypass is internal to said first functional unit.

17. The method as recited in claim 11, wherein said second functional unit includes a cryptographic unit, and wherein said given additional operation is unrelated to the instructions issued from said instruction fetch logic to said first functional unit.

18. The method as recited in claim 17, wherein said cryptographic unit is configured to perform modular arithmetic operations.

19. The method as recited in claim 11, wherein said temporary result storage is further configured to selectively store said result of said given additional operation dependent upon a control indication from said second functional unit.

20. The method as recited in claim 11, wherein said temporary result storage includes one or more shadow registers.

21. A system, comprising:
a system memory; and
a processor coupled to said system memory, wherein said processor comprises:
instruction fetch logic configured to issue instructions;
a first functional unit configured to execute instructions issued from said instruction fetch logic; and
a second functional unit configured to execute operations in response to instructions issued by said instruction fetch logic without receiving and decoding instructions corresponding to said operations from said instruction fetch logic, wherein said operations execute asynchronously with respect to instructions issued from said instruction fetch logic;

wherein during the course of executing at least one of said operations, said second functional unit is further configured to issue one or more additional operations to said first functional unit for execution, wherein said one or more additional operations are issued asynchronously with respect to said instructions issued to said first functional unit, and wherein no program counter value visible by said instruction fetch logic is associated with said one or more operations issued to said first functional unit by said second functional unit;

wherein said second functional unit is configured to provide one or more operands corresponding to a given one of said one or more additional operations to said first functional unit;

wherein said first functional unit comprises temporary result storage configured to store a result of said given additional operation while said first functional unit executes a given instruction issued from said instruction fetch logic; and wherein said first functional unit is further configured to use said stored result as an operand of an operation issued subsequently to said given additional operation.

22. The system as recited in claim 21, wherein said instruction fetch logic is further configured to issue a first instruction from one of a plurality of threads during one execution cycle and to issue a second instruction from another one of said plurality of threads during a successive execution cycle.

23. The system as recited in claim 21, wherein said first functional unit includes a multiplier configured to execute floating-point multiplication instructions.

24. The system as recited in claim 23, wherein said multiplier is further configured to execute a modular multiplication operation.

25. The system as recited in claim 23, wherein said temporary result storage comprises an accumulator register and wherein said multiplier is further configured to execute a multiply-accumulate operation.

26. The system as recited in claim 21, wherein said second functional unit is further configured to issue a first one of said one or more additional operations and a second one of said one or more additional operations dependent on said first additional operation to said first functional unit for execution, wherein said first functional unit is further configured to bypass a respective result of said first additional operation from a result execution stage of said first additional operation to an input execution stage of said second additional operation, and wherein said bypass is internal to said first functional unit.

27. The system as recited in claim 21, wherein said second functional unit includes a cryptographic unit, and wherein said one or more additional operations are unrelated to the instructions issued from said instruction fetch logic to said first functional unit.

28. The processor as recited in claim 1, wherein at least some of said instructions issued by said instruction fetch logic are executable to write to one or more control registers, and wherein to execute said operations in response to instructions issued by said instruction fetch logic, said second functional unit is further configured to receive said operations via said one or more control registers.

29. The method as recited in claim 11, wherein at least some of said instructions issued by said instruction fetch logic are executable to write to one or more control registers, and wherein said second functional unit executing said operations in response to instructions issued by said instruction fetch logic comprises second functional unit receiving said operations via said one or more control registers.

30. The system as recited in claim 21, wherein at least some of said instructions issued by said instruction fetch logic are executable to write to one or more control registers, and wherein to execute said operations in response to instructions issued by said instruction fetch logic, said second functional unit is further configured to receive said operations via said one or more control registers.

* * * * *